No. 720,298. PATENTED FEB. 10, 1903.
D. M. SULLIVAN.
DOFFER FOR FIBER MACHINES.
APPLICATION FILED NOV. 22, 1901.
NO MODEL.
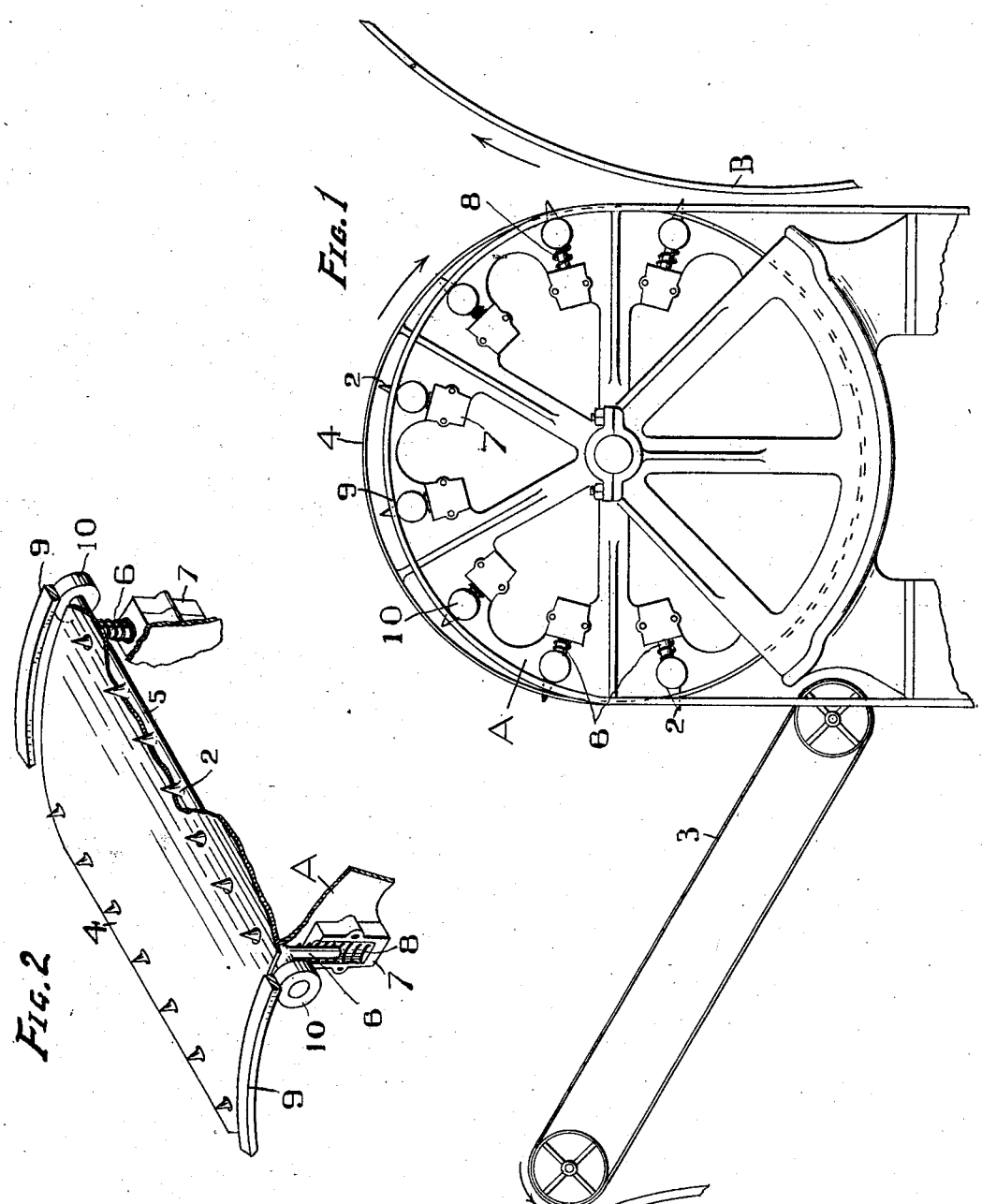

UNITED STATES PATENT OFFICE.

DANIEL MARK SULLIVAN, OF RIOVISTA, CALIFORNIA, ASSIGNOR TO THOMAS & ETTINGER, OF RIOVISTA, CALIFORNIA, A FIRM.

DOFFER FOR FIBER-MACHINES.

SPECIFICATION forming part of Letters Patent No. 720,298, dated February 10, 1903.

Application filed November 22, 1901. Serial No. 83,323. (No model.)

*To all whom it may concern:*

Be it known that I, DANIEL MARK SULLIVAN, a citizen of the United States, residing at Riovista, county of Solano, State of California, have invented an Improvement in Doffers for Fiber-Machines; and I hereby declare the following to be a full, clear, and exact description of the same.

My invention relates to improvements in machines for working hemp, flax, ramie, or other similar fiber.

It consists of the parts and the constructions and combinations of parts hereinafter described and claimed.

Figure 1 is a side elevation showing the invention. Fig. 2 is an enlarged perspective of part of the device.

In machines for the preparation of hemp and other fiber the stalks are crushed and broken, so as to separate the fiber from the woody portion. My present invention relates only to what is known as the "doffer," by which the fiber is carried successively from one portion of the machine to the other.

As here represented, A is a cylinder having its shaft journaled parallel with the shaft of the cylinder B, from which the material is delivered to the cylinder A. The cylinder B revolves at a rapid rate in one direction, and the cylinder A is caused to revolve in the opposite direction at a much slower rate. This cylinder A carries a series of projecting points or spurs 2 and means by which they are raised or projected upon their approach to the cylinder B, so as to engage the fiber and drag it from B, carrying it around during a partial rotation of the cylinder A, thence delivering it to a subsequent carrier 3.

In order to deliver the material from A, it is necessary to in some way retract the spurs or points 2 and entirely disengage them from the fiber, so as to leave the latter free to be delivered upon the carrier 3, by which it is removed. The points or teeth 2 may be turned down or otherwise retracted by any suitable or desired mechanism. In the present case I have shown the points projecting through holes in the outer cover or cap 4 of the cylinder, and the inner ends of the points are secured to bars, as 5, these bars being periodically moved outward to project the teeth or spurs when they revolve in proximity with the cylinder B' and to again retract them when they reach the carrier 3. As at present shown, the bars 5 have radial and inwardly-projecting portions, as 6, and these enter hollow guides 7, carried by the wheel or drum A. Within these guides are springs 8 of sufficient stiffness, which normally act to force the bars 5 and the teeth 2 out through the exterior cover or casing of the drum or cylinder.

9 represents cams fixed near the cylinder and so disposed with relation to the other parts that they will force the bars 5 inwardly and retract the teeth, so as to leave a smooth outer surface and free the fiber, so that it can be delivered to the carrier 3. Various devices may be employed to operate these parts; but I have found that the cam is a very suitable method. The bars 5 are here shown as extended beyond the ends of the drum or cylinder A, and upon these projecting ends are formed journals, upon which the rollers 10 are turnable. These rollers standing in the vertical plane of the cams 9 engage these cams during the revolution of the drum, and the bars and teeth are thus depressed until they have passed the cams, when they are again allowed to project as they arrive near the face of the cylinder B, so as to engage the material carried by said cylinder and transfer it to the carrier 3.

Having thus described my invention, what I claim, and desire to secure by Letters Patent, is—

1. A doffer for fiber-machines including a cylinder having a cover with a transverse line of holes at intervals; transverse bars disposed around the inner circumference of the cover and having fixed spurs or points extending in line below the holes in the cover and at right angles to the length of the bars, said bars having their end portions extended beyond the ends of the cylinder and provided with rollers, and having other portions extended toward the axis of the cylinder, and spring-supported at points outside of the cylinder, and cam-tracks fixed adjacent to and outside the ends of the cylinder, to be engaged by said rollers to retract the bars against the power of their spring-supports and withdraw the points or spurs within the perimeter of the cover.

2. The combination with the cylinder B and the carrier 3, of a drum between the cylinder and carrier and including a cover having a series of transverse lines of holes made at intervals, a series of hollow guides carried by the drum and springs within the guides; a series of transverse bars arranged around the drum and having fixed points or spurs extending in line with the holes in the drum-cover, said bars having their ends extended beyond the ends of the drum, and provided with rollers, and said bars having, also, inwardly-extending end portions disposed outside of the vertical plane of the sides of the cylinder and fitting the said guides and seating upon the springs therein, and cam-tracks arranged outside of the ends of the drum and engaging the rollers to retract the bars, substantially as herein described.

In witness whereof I have hereunto set my hand.

DANIEL MARK SULLIVAN.

Witnesses:
JAS. U. CHASE,
E. M. CHASE.